(No Model.)
E. W. MERRILL, Jr.
DROP HAMMER.
No. 601,060. Patented Mar. 22, 1898.
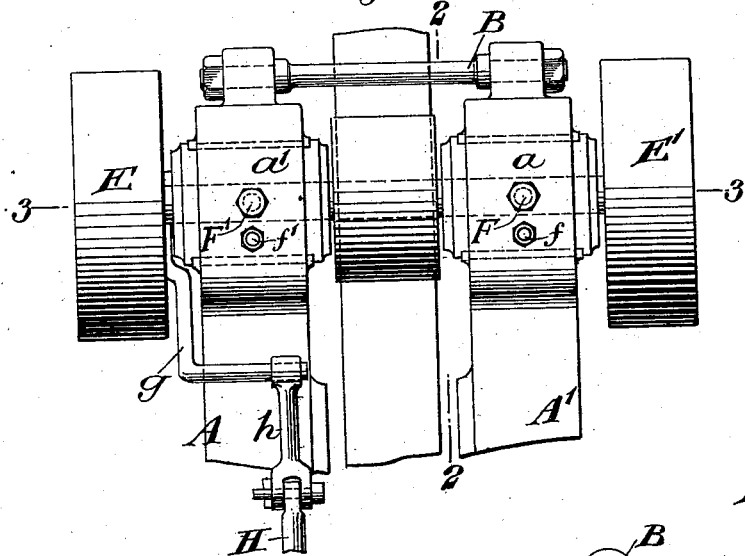
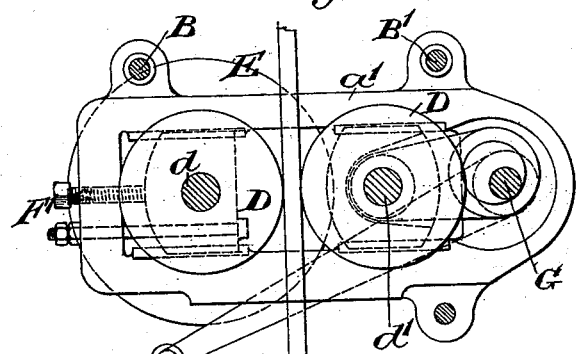
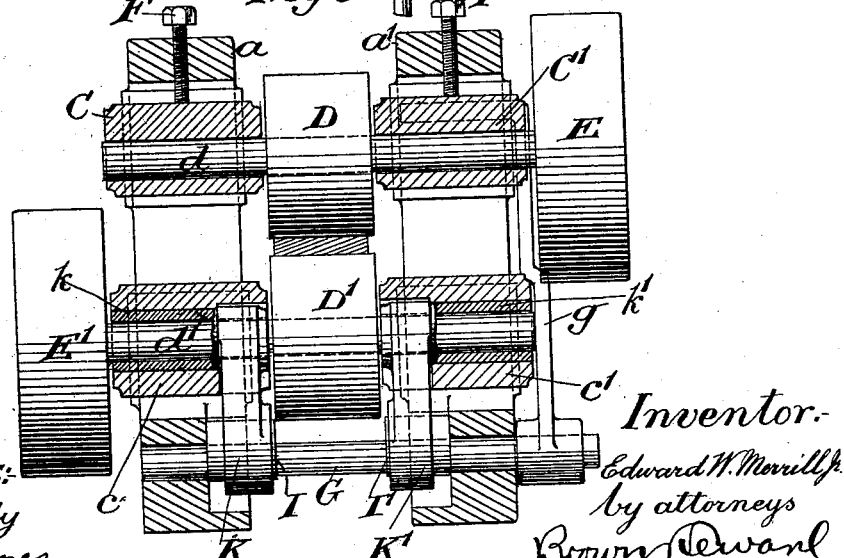
Witnesses:
John N. Tilly
Fred Haynes
Inventor.-
Edward W. Merrill Jr.
by attorneys
Brown & Seward

UNITED STATES PATENT OFFICE.

EDWARD W. MERRILL, JR., OF BROOKLYN, NEW YORK.

DROP-HAMMER.

SPECIFICATION forming part of Letters Patent No. 601,060, dated March 22, 1898.

Application filed June 13, 1896. Serial No. 595,449. (No model.)

*To all whom it may concern:*

Be it known that I, EDWARD W. MERRILL, Jr., of Brooklyn, in the county of Kings and State of New York, have invented a new and useful Improvement in Drop-Hammers, of which the following is a specification.

My invention relates to an improvement in drop-hammers in which the hammer is raised by the frictional contact of rollers with the stock or lifting-board, the object being to provide improved means for moving one of the rollers bodily toward and away from the other to grip and release the said stock or lifting board.

In the accompanying drawings, Figure 1 represents in front elevation the upper portion of the supporting-frame, the lifting-rollers, and the parts in immediate connection therewith. Fig. 2 is a section from front to rear on the plane of line 2 2 of Fig. 1, and Fig. 3 is a horizontal section in the plane of line 3 3 of Fig. 1.

The supporting-frame consists, as is common, of uprights A A' and heads $a$ $a'$, connected by tie-rods B B', the heads receiving sliding bearings C C' and $c$ $c'$, in which the axles $d$ $d'$ of the lifting-rollers D D' are mounted. The roller D has mounted upon its axle $d$ a drive-pulley E, and the roller D' has mounted upon its axle $d'$ a drive-pulley E', as is usual. The sliding bearings C C' are held in the desired adjustment by means of set-screws F F' and draw-bolts $ff'$, which project through the front ends of the heads $a$ $a'$.

In order to utilize the eccentric for the purpose of forcing the movable roll toward and away from the fixed roll and at the same time cause the movable roll to advance toward and recede from the fixed roll in a right line and prevent binding in the movable shaft, which is liable to occur after the pin becomes worn where the eccentric is applied directly to the movable roll, I have devised the following construction and arrangement of parts, which have proved eminently advantageous in practice.

In the heads $a$ $a'$, back of the movable roll, there is mounted in fixed bearings a shaft G, having connected therewith an operating crank-arm $g$, which extends to the front, as shown in Fig. 1, and is there connected with the side rod H by a connecting-rod $h$. The shaft G carries a pair of eccentrics I I', and these eccentrics are connected with the axle $d'$ of the movable roller D' by means of a pair of links K K', which links embrace the eccentrics I I' and also the axle $d'$ upon opposite sides of the roller D' with a fit as snug as is consistent with an easy rotary movement. The bearings of the links K K' with the axle $d'$ are extended, as shown at $k$ $k'$, to correspond with the length of the sliding bearings $c$ $c'$, so that the frictional wear between the axle $d'$ and said bearings is reduced to a minimum, and any tendency to bind as the roller D' is forced toward the lifting-board is obviated.

The shaft G as it is rocked simultaneously forces the links in one direction or the other to carry the roller D' toward or away from its corresponding roller with great exactness, and as its movement is short and comparatively slow the wear between the eccentrics and the links is very slight.

What I claim is—

The combination with the fixed roll and the movable roll supported in sliding bearings, of an eccentric-shaft mounted in fixed bearings and under the control of the side rod to be rocked and links embracing the eccentrics on the said eccentric-shaft and provided with extended bearings which embrace the axle of the movable roller upon opposite sides of the movable roller, substantially as set forth.

EDWARD W. MERRILL, JR.

Witnesses:
FREDK. HAYNES,
IRENE B. DECKER.